UNITED STATES PATENT OFFICE.

JAMES W. VALENTINE, OF NEW ORLEANS, LOUISIANA.

IMPROVEMENT IN THE MANUFACTURE OF HATS.

Specification forming part of Letters Patent No. 150,733, dated May 12, 1874; application filed July 29, 1873.

*To all whom it may concern:*

Be it known that I, JAMES W. VALENTINE, of the city of New Orleans and State of Louisiana, have invented a new and useful Improvement in the Manufacture of Hats; and I hereby declare the following to be a full, clear, and correct description of my invention.

The object of my invention is the utilization, in the manufacture of hat-bodies, of the leaves that surround and protect the young blossoms or fruit of the plant known as the palmetto palm of the West Indies. The nature of my invention consists in soaking these leaves in cold water, and removing the vegetable matter contained therein, as hereinafter fully described; then cutting the leaves into the desired lengths for hat bodies or crowns, and drying them over hat-blocks; after which they are coated with sizing, and by this means a porous and seamless hat is manufactured.

The construction and operation of my invention are as follows: As the fruit of the palmetto palm ripens, the leaves that surround it wither and fall to the ground. I then gather and soak them in cold water for a few hours, for the purpose of freeing them from all glutinous and superfluous substances. I then rub them between the hands, and rinse them in cold water. This process removes the vegetable matter contained within the fibrous part of the leaf, as well as that adhering to the outer side of the same, leaving, as it were, a fibrous shell or sack, of about six inches in diameter and three feet in length, terminating in a cone at the pointed end of the leaf. This sack or shell is then cut into the desired lengths for hat bodies or crowns, and drawn over and dried on hat-blocks. When thoroughly dried they are coated over with sizing, such as is generally used by hatters. The tops of these crowns are then drawn together, and secured by means of a string, which is tightly wrapped around the same. They are then transferred to the hat-blocks of the desired size, and, being tightly pulled down over the same, are ironed until the whole crown is perfectly smooth. The knot formed by the tying of the top is then cut off close to the crown, leaving a small circular opening in the same. This opening may be closed by a piece of cotton goods stiffened with gum-shellac; or a ventilating-eyelet may be inserted, if desired. The brim is made by first splitting the fibrous shell or sack lengthwise. It is then stretched open, and when thoroughly dried is soaked in gum-shellac and alcohol. Several of these pieces are then laid together, care being taken to have the fiber run in opposite directions, and pressed with a hot iron. From these pieces the brim of required size is cut, and may be joined to the crown by sewing, or in any other suitable manner. The hat is then varnished with shellac, or any other suitable water-proof varnish. The hat is then lined, and may be covered with cloth or not, as desired.

What I claim as new, and desire to secure by Letters Patent of the United States, is—

1. The process of preparing the leaves that surround and protect the fruit of the palmetto palm for the manufacture of hat-bodies, when said leaves are first soaked in cold water and the vegetable matter removed, as described, and then cut into the desired lengths and dried over hat-blocks, substantially as described.

2. As a new article of manufacture, a hat-body formed out of the leaves that protect the fruit of the palmetto palm, substantially as described.

JAMES WM. VALENTINE.

Witnesses:
CARSON MUDGE,
L. J. OLMSTEAD.